Figure 24:
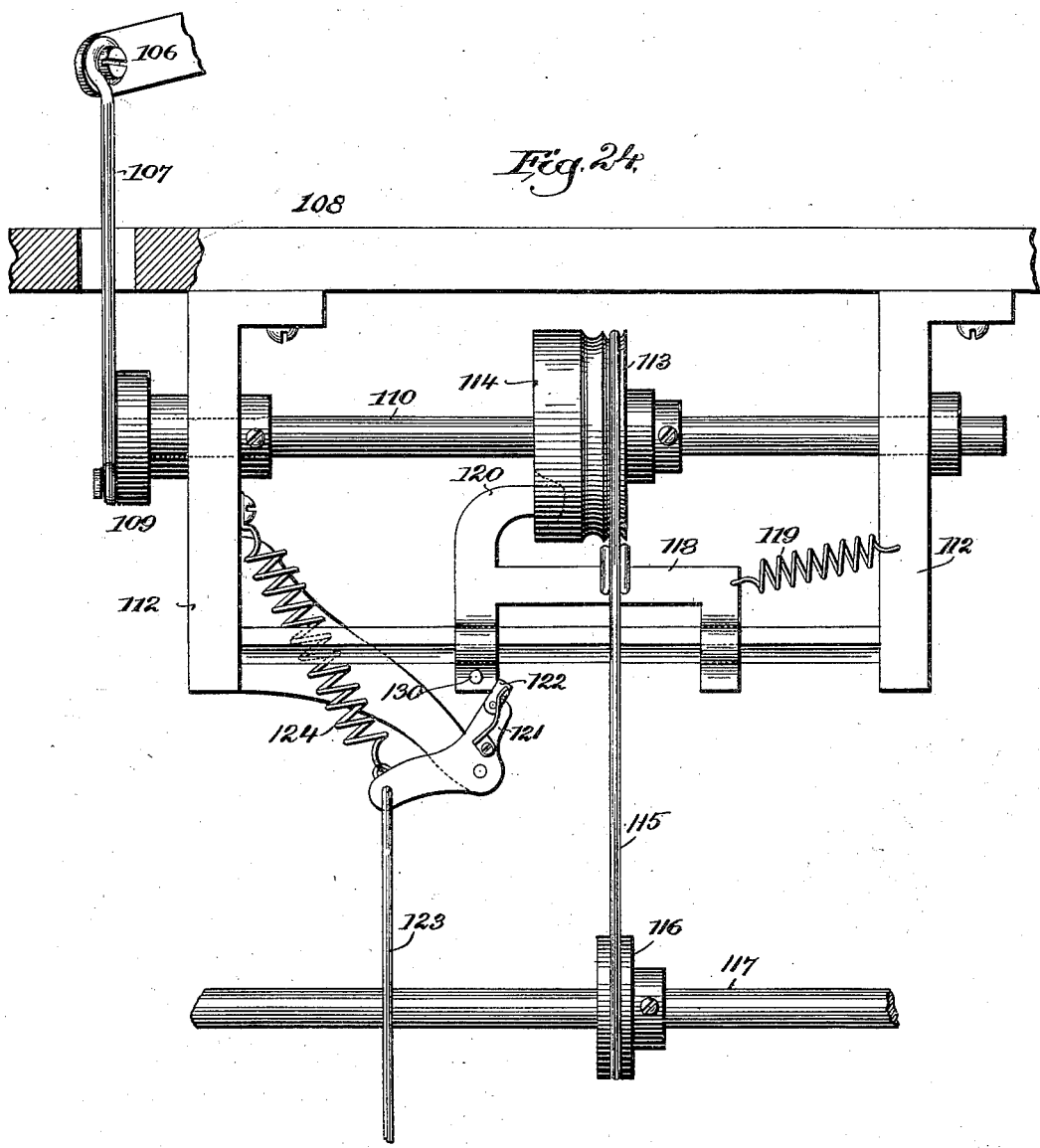

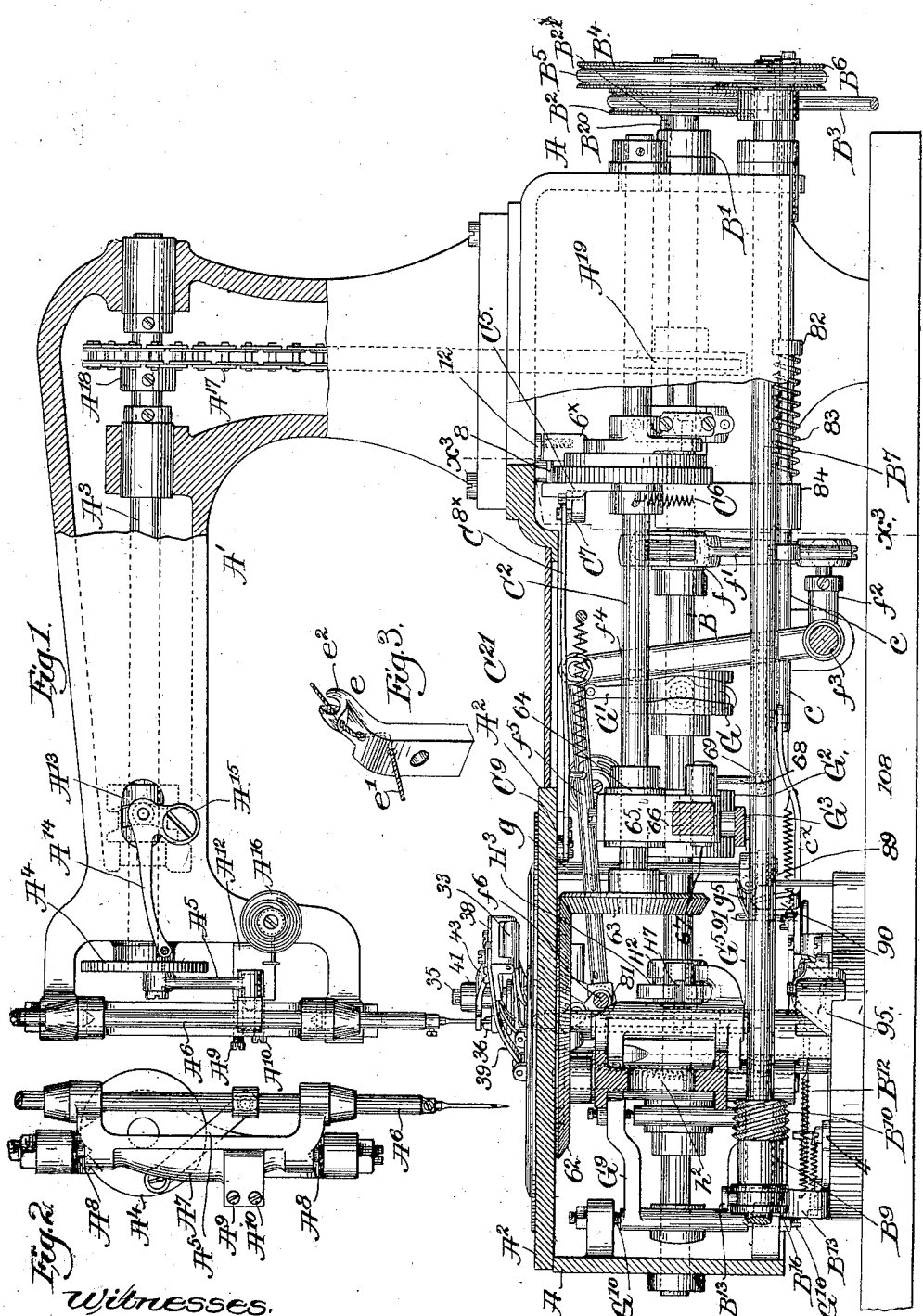

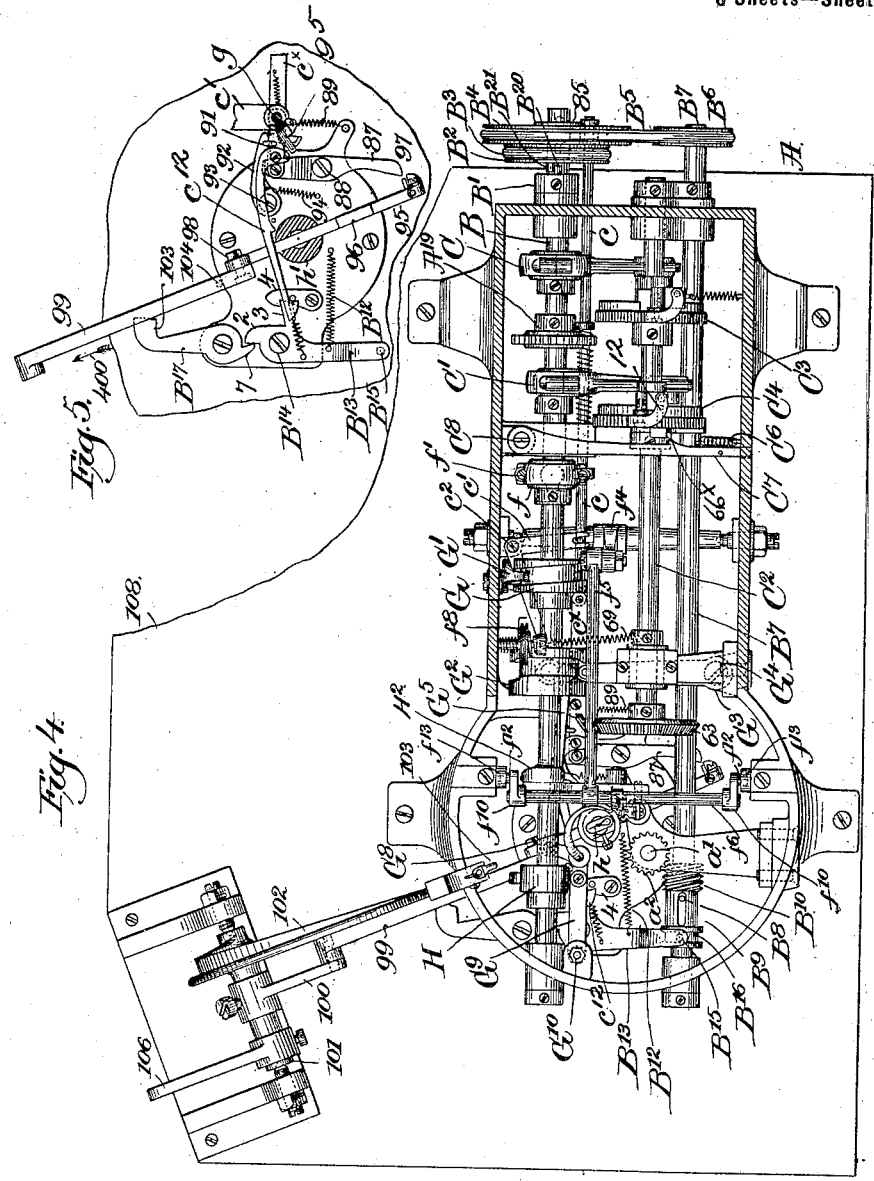

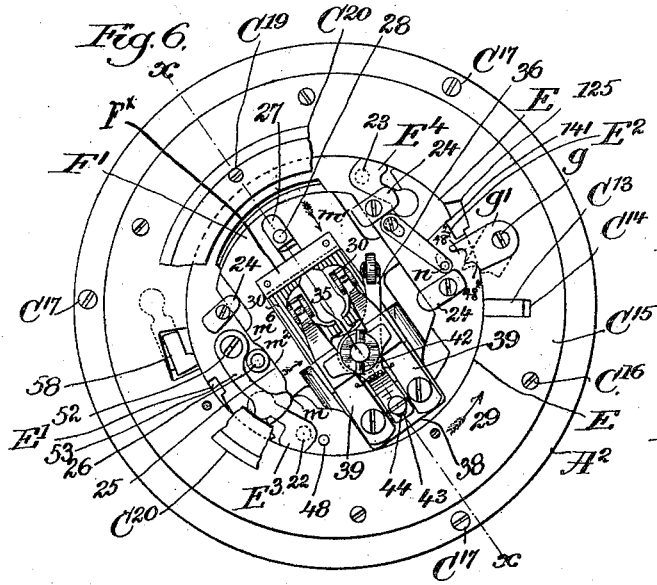
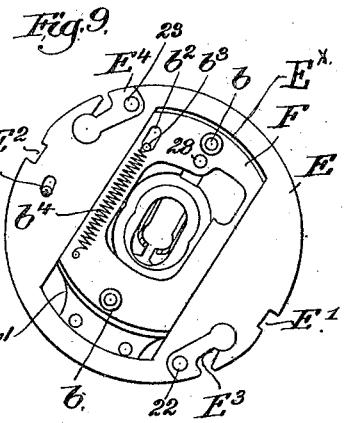
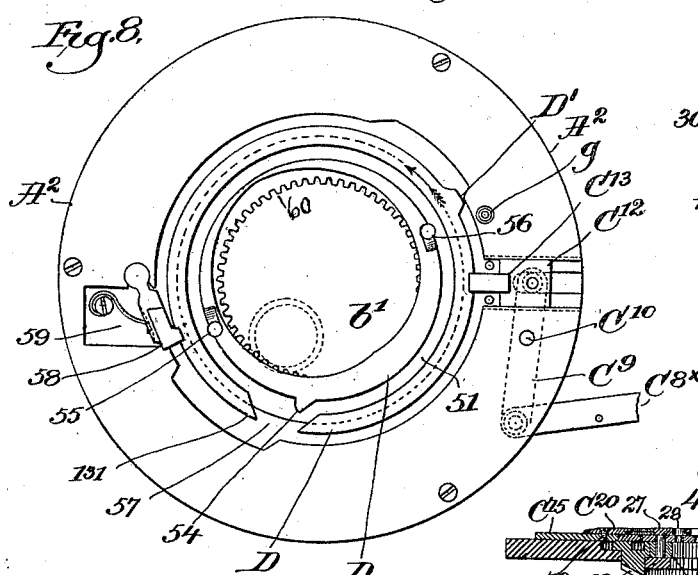
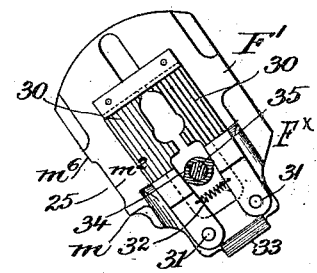
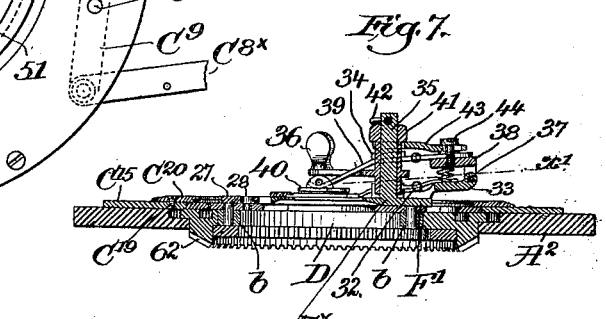
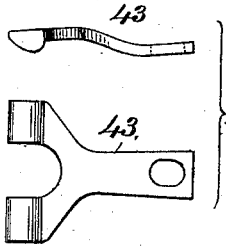

No. 696,698. Patented Apr. 1, 1902.
R. W. THOMSON.
BUTTONHOLE MACHINE.
(Application filed Jan. 20, 1892.)
(No Model.) 6 Sheets—Sheet 4.
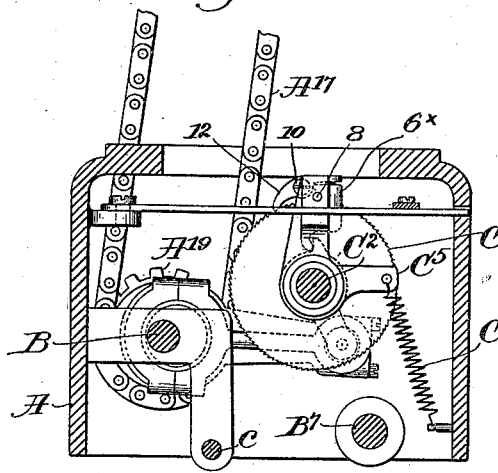
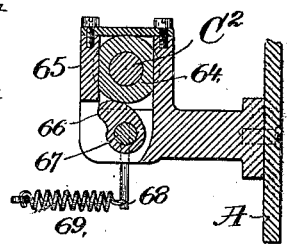
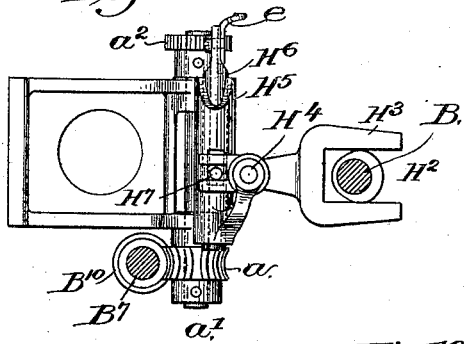
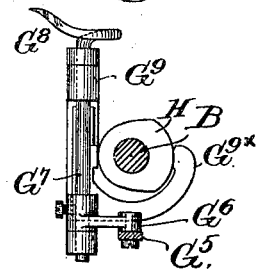
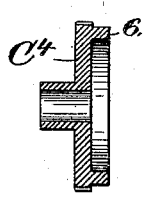
Witnesses:
John F. L. Prentiss
Edward F. Allen
Inventor:
Robert W. Thomson.
by Crosby & Gregory
Attys.

No. 696,698. Patented Apr. 1, 1902.
R. W. THOMSON.
BUTTONHOLE MACHINE.
(Application filed Jan. 20, 1892.)
(No Model.) 6 Sheets—Sheet 5.
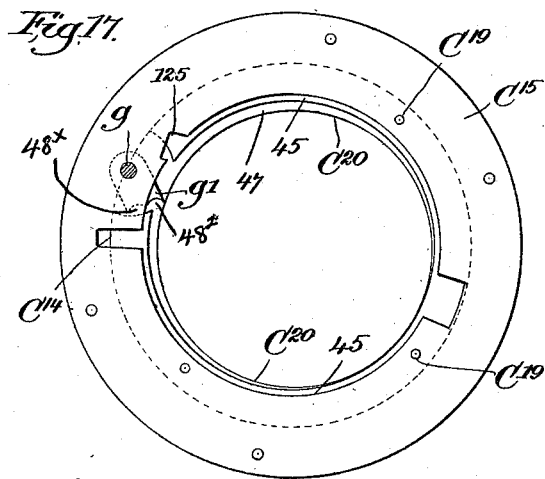
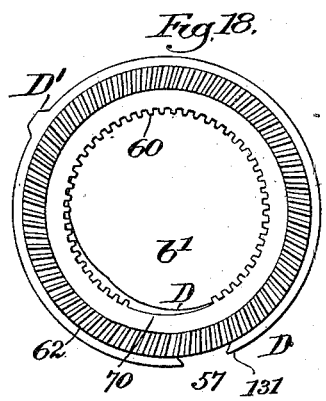
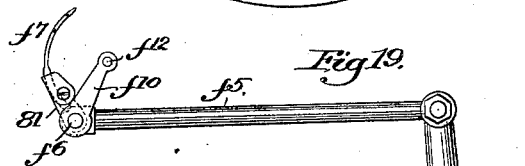
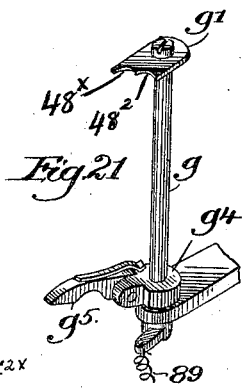
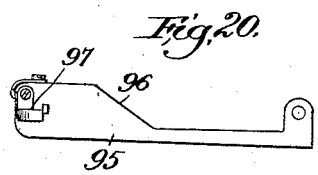
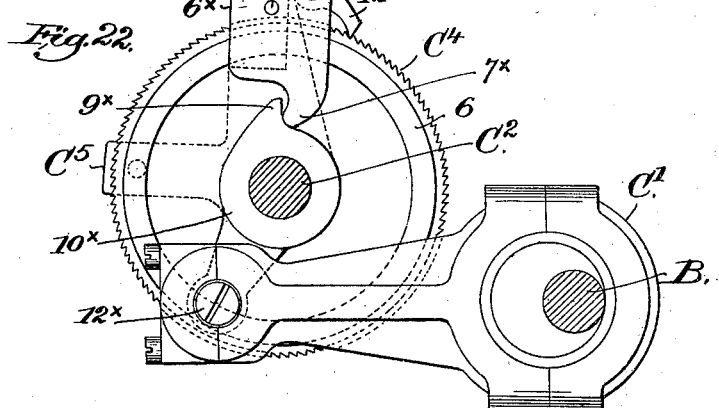
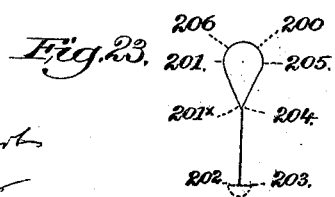
Witnesses.
John F. C. Pemberton
Edward F. Allen
Inventor.
Robert W. Thomson,
by Crosby & Gregory
attys.

No. 696,698. Patented Apr. 1, 1902.
R. W. THOMSON.
BUTTONHOLE MACHINE.
(Application filed Jan. 20, 1892.)
(No Model.) 6 Sheets—Sheet 6.

Witnesses.
John F. L. Prentiss
Edward F. Allen

Inventor
Robert W. Thomson,
by Crosby & Gregory
attys.

UNITED STATES PATENT OFFICE.

ROBERT W. THOMSON, OF LYNN, MASSACHUSETTS, ASSIGNOR TO REECE BUTTONHOLE MACHINE COMPANY, OF BOSTON, MASSACHUSETTS, A CORPORATION OF MAINE.

BUTTONHOLE-MACHINE.

SPECIFICATION forming part of Letters Patent No. 696,698, dated April 1, 1902.

Application filed January 20, 1892. Serial No. 418,670. (No model.)

*To all whom it may concern:*

Be it known that I, ROBERT W. THOMSON, of Lynn, county of Essex, State of Massachusetts, have invented an Improvement in Buttonhole-Machines, of which the following description, in connection with the accompanying drawings, is a specification, like characters on the drawings representing like parts.

This invention relates especially to machines for overseaming in the production of buttonholes.

The machine to be herein described forms an overedge-stitch from two threads, one of which is carried by a straight reciprocating eye-pointed needle which penetrates the material for the depth-stitch, the second thread being controlled by a thread-carrier or needle which passes through the slit or hole cut in the material held in a clamp and suitably stretched to expand the hole. The needle carrying the second thread and moving in the slit is shown as attached to a block mounted upon a horizontal rock-shaft having arms at its ends projecting at right angles therefrom, which arms are pivoted in substantially the horizontal plane occupied by the material during the stitch-forming operation, whereby said needle in passing its thread through the buttonhole may travel in the same curve both above and below the material being stitched. A looper coacts with the loop of needle-thread and spreads the same in the path of the ascending under-thread carrier, and that the looper may properly perform its duty and not be interposed in the path of the ascending under-thread carrier I have mounted the shaft of the looper in a movable bearing, so that the looper as the same is having imparted to it a rotative movement is also moved bodily laterally. The clamp holding the material is mounted in a rotatable carrier sustained in a suitable guideway, said carrier having coöperating with it suitable devices to at times restrain and at other times permit the rotation of the carrier. The carrier is rotated for more than a full rotation during the time that the stitch-forming mechanism is overstitching the entire edge of a buttonhole. The rotative movements of the carrier are divided into a plurality of operations, a portion of this more than full rotation taking place at one end of the buttonhole, the remaining partial rotation taking place at the opposite end of the buttonhole.

The carrier referred to has a guideway in which is slidably mounted a plate upon which is pivotally mounted a clamp to hold the material to be stitched, said clamp being so connected with the plate that its base may be slid longitudinally on the plate and also be swung laterally on the plate about a pivot. The swinging movement of the clamp on the plate takes place while the plate and clamp are being moved longitudinally and the overstitching of the side edges of the buttonhole are being stitched near the large eye and also while the large eye at one end of the buttonhole is being stitched. The clamp is slid longitudinally in the carrier when the side edges of the buttonhole are being stitched by or through a cam on a ring. The ring has a cam-groove that at the proper times engages dogs pivoted on the carrier and moves them to engage a stationary part and lock the carrier, and at other times said ring moves the dogs to release them from the part engaged by them to unlock the carrier, that it and the work-clamp may be rotated, as when the round ends of the buttonhole are to be overstitched. The ring has an inner heart-shaped cam which when the carrier is restrained from rotation acts upon suitable roller or other studs of the plate upon which the work or cloth clamp is pivotally mounted, sliding said clamp in the carrier, this being done while the straight sides of the buttonhole are being overstitched.

In the machine to be herein described the overedge-stitching is shown as started at the large end of the eye of the buttonhole and at one side of the longitudinal center of the buttonhole, and the first movement of the clamp and carrier is one of rotation, that the overedge-stitching may be made in a curved line, said stitches meeting about the center of said large eye, and a portion of the said eye having been overstitched and the stitching having arrived at what is to constitute one side of the buttonhole the further rotation of the carrier is restrained and the clamp has imparted to it a longitudinal movement, which is continued while one straight side of the buttonhole is being stitched, and during a portion of the time of stitching the side of the buttonhole the clamp is swung laterally on the plate carrying it to provide for a wider space in a part of the buttonhole near said eye. The stitching having arrived at the small end of the buttonhole, the carrier, the rotation of which was restrained during the longitudinal movement of the clamp, is released, and immediately thereafter the carrier and clamp are rotated for substantially one hundred and eighty degrees, thus enabling the stitching to be carried around the small end of the buttonhole, and this done the rotation of the carrier is again arrested and the clamp is again slid in the carrier while the second side edge of the buttonhole is being stitched, the clamp also being preferably swung laterally on the plate carrying it, and the straight side having been completed the carrier is again released, and it and the clamp are again rotated, so that overedge-stitching is again made about the large eye, which was partly overstitched when starting the stitching of the buttonhole, the stitching completing the buttonhole terminating only after it has been carried for a greater or less distance to overlap the stitching made when the buttonhole was commenced. A buttonhole having been stitched by a rotation of the cloth-clamp for more than three hundred and sixty degrees, suitable devices come into operation to stop automatically the stitching mechanism and render inoperative certain feeding means which during the stitching of a buttonhole act to move the ring and the clamp, said feeding means operating at the proper times at one speed to effect a short stitch along the side edges of the buttonhole and at other times to effect a longer stitch about the ends of the buttonhole. The stitch-forming mechanism having been stopped and the feed-shaft $C^2$ having also been stopped, further movement of the ring referred to, controlling the movement of the clamp, is made at a faster speed, moving the clamp, while the stitch-forming mechanism is at rest, into the position where the material containing the stitched buttonhole is to be removed and material to be inserted in the clamp to have a buttonhole-slit cut in the same. This faster movement of the ring and clamp is in a backward direction for but a portion of a rotation, just sufficient to return the clamp into its starting position, and on the arrival of the clamp in its starting position a device, to be described, engages a notch in the carrier, arresting the movement of the carrier and clamp, and thereby determining the exact position that the clamp shall occupy when the material is to be removed and new material is to be applied thereto. The material having a stitched buttonhole having been removed from the clamp, the material in which another buttonhole is to be made is put into the clamp and the clamp is closed, and thereafter the operator slides the clamp on the plate, upon which it is mounted loosely, against the stress of a suitable spring, thus putting the material held by the clamp in position over one member of a buttonhole-cutting mechanism, and the other member is then actuated to cut in the material held in the clamp the slit for the buttonhole to be made, and the clamp is then returned into starting position by the spring referred to.

The buttonhole-stitching mechanism and feeding mechanism are started automatically by the return into its inoperative position of the buttonhole-cutting devices.

The buttonhole-cutting mechanism consists, essentially, of a rising-and-falling anvil and a movable blade, the anvil rising from below against the under side of the material held in the clamp and supporting the same against the action of the cutting-blade.

I have devised a peculiar non-rotatable throat-plate and have provided means whereby it has imparted to it a vertical movement, so that the throat-plate supports the material at the stitching-point while the needle is in the material and the stitch is being formed, the said throat-plate being, however, lowered substantially from contact with or so as to free the material from friction between the throat-plate and the material during the feeding operation of the clamp. When overstitching a buttonhole, the shaft for actuating the feeding mechanism for the clamp, said mechanism including a cam-ring, has imparted to it a greater movement during the formation of each stitch around the ends of the buttonhole than when the stitching is being performed along the sides of the buttonhole, and to enable the extent of this feeding motion, both at the sides of the buttonhole and about the eye or ends, to be separately controlled according to the requirements of the work to be done I have provided independent mechanism for moving the feed-shaft at these different times, one of the said mechanisms being under the control of the ring which actuates the clamp, so that at the proper time the feeding mechanism for moving the clamp while stitching the eyes or ends of the buttonhole may be suspended and the other mechanism be permitted to operate, and vice versa.

Figure 25:

Figure 1 is a side elevation, partially broken out, of a sewing-machine embodying my invention; Fig. 2, a detail showing the front end of the head with the adjustable gate in which the needle-bar is to be reciprocated. Fig. 3 is a detail showing the throat detached and as leading the gimp or edge cord. Fig. 4 is a plan view of the machine with the table-plate removed, the intention being to show the main working parts, which are inclosed in the base of the framework, said figure showing the cutting mechanism; Fig. 5, a detail of the cutting mechanism as it will appear when the machine is stitching a buttonhole. Fig. 6 is a top or plan view of the work-clamp, the clamp-carrier, and the raceway in which the clamp-carrier rotates, the cap-ring of the raceway being partially broken out. Fig. 7 is a longitudinal section of Fig. 6 in the line $x$. Fig. 8 is a top or plan view immediately below the parts shown in Fig. 6, said Fig. 8 showing parts which are covered by the parts shown in Fig. 6 when the machine is in working condition. Fig. 9 is an under side view of the work-clamp carrier and work-clamp or work-holder. Fig. 10 is a top view of the lower part of the clamp or a view of the work-clamp below the dotted line $x'$, Fig. 7. Fig. 11 shows in two different views the pressure-regulator for the work-clamp; Fig. 12, a sectional detail in about the line $x^3$, Fig. 1, looking to the right; Fig. 13, details of the devices for permitting the feed-shaft to drop and disengage the bevel-wheel carried by it from the bevel-gear or ring for actuating the feed-clamp carrier and work-clamp; Fig. 14, a detail referring to the operation of the throat-plate; Fig. 15, details of the loop-spreader. Fig. 16 shows one of the feed-wheels in section. Fig. 17 is an under side view of the raceway-plate $C^{15}$ shown in Fig. 6 turned over to the left from the position shown in said figure, the shaft $g$ being shown as cut off to thus enable the knock-off device $g'$ to be shown as it lies between the raceway and the cap-ring. Fig. 18 is an under side view of the ring D. Fig. 19 is a detail showing the under needle and some of its actuating mechanism. Fig. 20 is a detail in side elevation of one of the bars used in connection with the buttonhole-cutting mechanism. Fig. 21 is a detail showing the knock-off device and some of the parts coöperating with it. Fig. 22 is an enlarged detail showing in side elevation one of the feeding-wheels and its actuating devices. Fig. 23 is a diagram showing an outline of a buttonhole with numbers to be referred to in the description as to the manner of stitching the same. Fig. 24 is a detail, enlarged, of the starting mechanism to start the cutter, the latter in its movements starting the stitching mechanism; and Fig. 25 is a detail showing the stop 90, to be referred to.

Referring to the drawings, A represents the lower part of the framework of the machine, it supporting an overhanging arm $A'$ and having what I shall denominate a "table-plate" $A^2$. The overhanging arm has suitable bearings for the needle-bar-actuating shaft $A^3$, provided at its front end with a crank $A^4$, which by a link $A^5$, jointed to a suitable collar fast on the needle-bar $A^6$, reciprocates the said needle-bar in suitable bearings of a gate $A^7$, mounted upon centers $A^8$, shown as pointed screws mounted in the overhanging arm, said gate having two screws $A^9$ $A^{10}$ extended through an ear thereof, (see Figs. 1 and 2,) the screw $A^9$ being adapted to be screwed more or less through the said ear and to contact with a lug $A^{12}$, connected to the overhanging arm, to thus determine the exact position of the needle of the needle-bar with relation to the throat to be described, the screw $A^{10}$ entering said lug and fastening the said gate in its adjusted position. By these screws it is possible to adjust the gate more or less about its pivotal point, so as to bring the needle in exactly the proper working position with relation to the parts with which it coöperates in the production of the stitch and insure the proper or desired length of overedge-stitch.

The shaft $A^3$ has fast upon it a cam-hub $A^{13}$, which receives a roller or other stud of the take-up lever $A^{14}$, pivoted at $A^{15}$, the said take-up receiving through its eye the needle-thread, supplied from some suitable source and passed through the tension device $A^{16}$, the thread going from the take-up in usual manner to and through the eye of the needle.

The shaft $A^3$ derives its rotation from a chain $A^{17}$, extended over a sprocket-wheel $A^{18}$ and driven from a sprocket-wheel $A^{19}$, fast on the main shaft B, supported in suitable bearings in the lower part of the framework.

The shaft B has fast upon it outside the framework a collar $B'$, having a suitable pin or projection $B^{20}$ to form part of a clutch, the second part of the clutch being a pin or projection $B^{21}$, extended from a pulley $B^2$, mounted loosely upon the said shaft and driven substantially constantly by a suitable belt, as $B^3$, driven from some suitable source of power.

The shaft B has upon it three suitable eccentrics, two of which are embraced by eccentric-straps C C', both alike, the eccentrics embraced by them being set a little more than quartering as to their throw. Both these eccentric-straps are adapted by like intermediate mechanisms to rotate the shaft $C^2$, which is moved at two different speeds, as will be described, to actuate the feeding mechanism at the proper speed. In Fig. 1 I have omitted from the shaft B one of these eccentrics and from the shaft $C^2$ one of the feed-wheels, such parts being, however, shown in Fig. 4, said parts having been omitted from Fig. 1 to save undue complexity of the drawing. The construction of one of these two like feed-wheels and its actuating parts is, however, shown in Fig. 22. One of these feed-wheels—viz., the one marked $C^3$—is instrumental in rotating the shaft $C^2$ to move the work-clamp, to be described, while the straight sides of the buttonhole are being stitched, at which time the movement of the shaft is the least, whereas the feed-wheel $C^4$ is instrumental in giving to said shaft a further throw at each movement to move the cloth-clamp faster while the stitching is being carried on about the ends or eyes of the buttonhole. I shall specifically describe the actuating mechanism for but one of these feed-wheels, the other being the same, and the one which I shall describe is the one marked $C^4$. (See Fig. 22.) The wheel $C^4$ is fast upon the feed-shaft $C^2$ and has at its periphery a series of ratchet-teeth, and at its rear side the said wheel is cut away, so as to leave a flange 6, which is embraced by a groove in a dog $6^\times$, having its fulcrum on a stud 8, carried by an elbow-lever $C^5$, mounted loosely upon the said feed-shaft at the opposite side of the said wheel, the said elbow-lever being acted upon by a spring $C^6$, which normally keeps the stud 8 pulled toward the right viewing Fig. 12 or to the left viewing Fig. 22, the said spring serving to retract the dog upon the wheel. The dog $6^\times$ has an arm $7^\times$, (best shown in Figs. 22 and 12,) which when the wheel $C^4$ is to be rotated for making longer stitches about the edge is acted upon by a toe $9^\times$ of a lever $10^\times$, mounted loosely upon the shaft $C^2$ at one side of the said feed-wheel, said lever having a stud $12^\times$, embraced by the eccentric-strap $C'$. The upper end of the dog in this instance of my invention has a stud-screw 10, upon which is pivoted a pawl 12, which engages the ratchet-teeth of the wheel, so that the said wheel is moved not only by the dog gripping its flange 6, but also by the pawl engaging the ratchet-teeth of the wheel, the movement of the pawl keeping the feeding operation up to its standard efficiency notwithstanding wear of the dog upon the flange. Instead of the particular form of dog, or "friction mechanism," as it is ordinarily called in sewing-machines, I may use any other usual or equivalent device commonly employed for rotating a wheel under like circumstances.

The feed-wheel $C^3$, hereinbefore described as employed for rotating the shaft $C^2$ at its slowest speed while the clamp is being moved to stitch the side edges of a buttonhole, is always in motion, its movement being effected by a dog and pawl, as described of the wheel $C^4$; but while the straight sides of the buttonhole are being stitched the elbow-lever $C^5$, coöperating with the wheel $C^4$, is locked in a position to hold the dog $6^\times$ and pawl 12 for actuating the wheel $C^4$ in the extreme of their effective throw by a projection $66^\times$, (see Fig. 4,) carried by a lever $C^7$, forming part of compound locking means, said projection restraining the movement of the lever $C^5$, so that the wheel $C^4$ may travel freely through the dog $6^\times$, its teeth clicking under the pawl 12, said shaft $C^2$ at such time being rotated slowly by or through a dog and pawl like the pawl $C^\times$ and pawl 12, but which coöperates with the wheel $C^3$, the latter wheel then determining the extent of the throw of the shaft $C^2$ to space the stitches along the sides of the buttonhole, such stitches being shorter than the stitches about the ends of the buttonhole.

The lever $C^7$, having the projection for locking the elbow-lever $C^5$, as described, is pivoted at $C^8$ and has connected to it at its opposite end a link $C^{8\times}$, jointed at its opposite end to one end of a lever $C^9$, (shown in Fig. 1 and by dotted lines in Fig. 8,) said lever being pivoted at $C^{10}$ on the table-plate $A^2$ and connected loosely with a stud on a slide-block $C^{12}$, having a projection $C^{13}$, which constitutes locking means to prevent the rotation of the work-clamp and the carrier E, to be described, that sustains it during the time that the side edges of the buttonhole-slit are being stitched.

The table-plate $A^2$ has a groove that receives a ring or raceway $C^{15}$, having a circular opening which receives what I have herein designated as the "carrier" E, it forming part of the cloth-clamp. The carrier E has a central space $E^\times$, which receives a plate F of less length than the slot. The under side of the plate has roller or other studs $b$, which are normally in contact with the inner heart-shaped cam-face $b'$ of a ring D, which is sustained by and made revoluble in the table-plate to slide the clamp. The plate F sustains at its upper side the cloth-clamp $F^\times$, composed of a base $F'$ and suitable arms 39, having members 40 to bear upon the surface of the material to be held in the clamp and impinge the under side of the material against the serrated surface 30, connected with the base $F'$ of the clamp, and usual means are employed for moving the arm to stretch the buttonhole-slit after the same has been cut. The base-plate of the clamp, slotted near one end to embrace loosely a block 28, pivoted on a stud rising from the plate, has a pin $b^3$, which (see Fig. 9) is extended through a hole $b^2$ in the plate F, a suitable spring $b^4$, connected at one end with said pin and at its opposite end with the plate, sustaining the clamp-base in a yielding manner upon the plate F for a purpose to be hereinafter described. The carrier E has two notches $E'$ $E^2$, and said carrier has other notches in which are pivoted two dogs $E^3$ $E^4$, said dogs having respectively pins 22 and 23, which extend downwardly and enter a groove 51 in the top of the ring D. The ring constitutes the feeding means for moving the clamp throughout the operation of overstitching the entire edge of a buttonhole.

The carrier E is retained in operative position by means of a cap-ring $C^{20}$, secured by suitable screws to the raceway-plate $C^{15}$, said cap-ring being mostly broken away in Fig. 6 to show parts below it.

The raceway-plate $C^{15}$ has a notch $C^{14}$, in which enters and moves the projection $C^{13}$, before described, said projection at times being acted upon and pushed backwardly or to the right, Figs. 1 and 6, and at other times the projection enters one or the other notch $E^2$ or $E'$.

A spring $C^{21}$, connected with the link $C^{8\times}$ at one end and at its other end with a fixed projection, acts normally to keep the projection $C^{13}$ pressed against the edge of the carrier E, and at such time the projection $66^\times$ of the lever $C^7$ releases the dog operated to turn the feed-wheel $C^4$ to impart faster movement to the feed-shaft $C^2$.

Whenever the projection $C^{13}$ enters one of the notches, as $E'$ or $E^2$, the rotative movement of the carrier E and also of the work-clamp is arrested, and the lever $C^7$ is immediately moved to cause the projection $66^\times$ to lock the means for rotating the wheel $C^4$, leaving only the wheel $C^3$ in operation, it moving the wheel $C^3$ at a slower speed and turning the ring D, so that the heart-shaped cam $b'$, acting upon the rollers $b$ of the plate F, carrying the work-clamp, moves the clamp longitudinally. It will therefore be understood that the shaft $C^2$ is run at two different speeds to actuate the clamp at two different speeds, the slowest speed of the clamp being while the latter is being slid longitudinally in the carrier and while overedge-stitches are being made at the sides of the buttonhole, the movement of the clamp being faster while it and the carrier are being rotated, the overedge-stitching then taking place about the ends of the buttonhole, said stitches radiating about the center of the round end of such hole.

The clamp during the stitching of each buttonhole is rotated for more than a full rotation, said full rotation of the clamp being partially effected at two different times, one while stitching about the large and the other about the small end of the buttonhole.

The ring D has a projection $D'$, which whenever the clamp is to be rotated while overstitching a buttonhole about its ends meets the projection $C^{13}$ and pushes it out of the notch $E^2$ or $E'$, whichever is engaged, the spring $C^{21}$ causing the said projection to enter said notches in succession whenever they arrive opposite the projection, to thus lock and prevent temporarily the further rotation of the carrier and clamp, as while overstitching the side edges of the buttonhole-slit.

The slot $b^2$ in the plate F enables the work-clamp, guided by the block 25, to be moved longitudinally on the plate F when the clamp is locked in its position to receive material to be cut and stitched, such movement of the clamp putting it into its inoperative position—that is, the position it will not occupy while the ends of the buttonhole are being stitched—so that the material held in the clamp may be brought into the proper relation to the cutting mechanism to be described, which acts to cut the slit in the material, and immediately thereafter the spring $b^4$ acts to return the cloth-clamp from its inoperative to its starting position. The base $F'$ of the work-clamp is broader than the slot $E^\times$ in said carrier E, and said base is kept seated in said carrier by gibs 24, (see Fig. 6,) attached to said carrier and overlapping the edges of said base. One edge of the base $F'$ is curved or concaved, as at 25, and said edge is kept pressed against a roller or other stud 26, fixed on the carrier E, by or through the spring $b^4$ referred to, for the stud $b^3$ is connected with the said base $F'$ at the opposite side of its longitudinal center, the said base having its pivotal point upon a block 27, (see Fig. 6,) mounted loosely upon a stud 28, fixed upon the slide F. Whenever the work-clamp is moved about the stud 28 in the direction of the arrow 29, Fig. 6, so as to take it away from the roller 26, the spring $b^4$ is stretched. The slot in the base $F'$, in which stands the block 28, is longer than the said block, so that the clamp may slide longitudinally against the spring $b^4$ when a buttonhole is to be cut in the material.

Fig. 10 shows the base $F'$ of the work-clamp and its under jaws 30, the latter being represented as levers pivoted at 31 and normally pulled toward each other by a suitable spring 32. The base $F'$ has a stand 33, from which rise the pivots 31 of these levers, and between the levers is located a cam-sleeve 34, mounted upon a stud 35, rising from the base $F'$, the said sleeve having an operating-handle 36, so that when the sleeve is turned into the position Fig. 10 the under jaws are spread apart, the other position of the sleeve (turned one-quarter around from the position Fig. 10) allowing the spring 32 to close the jaws. The stand 33 has pivoted upon it at 37 a block 38, (see Fig. 7,) to which is attached by suitable set-screws the arms 39, having the feet 40, constituting the upper members of the work-clamp, the said arms being spring-arms. The cam-sleeve 34 referred to is also so shaped or is provided with a collar 41 at its upper end, the upper side of said collar being cam-shaped to act against a pin 42 and cause the sleeve to be slid downwardly as it is rotated by its hand-lever 36 in one direction. During this downward motion the under side of the said collar acts on the bridge 43. (Shown separately in Fig. 11.) This bridge is connected by a screw 44 with the block 38, and the under side of the bridge is so shaped that by turning the screw in more or less the bridge will be more or less tipped, and the higher the outer or large end of the bridge the greater will be the effective force with which the clamp will hold the goods when the lever 36 is turned to cause the clamp to be closed upon the goods.

The cap-ring $C^{20}$, broken away in Fig. 6, together with the raceway $C^{15}$, is shown inverted in Fig. 17, and it will be seen that the inner edge 45 of the raceway is a true circle and that the inner edge of the cap-ring $C^{20}$ is also a true circle; but the circle of the ring is set eccentric to the circle of the raceway, for a purpose to be described.

In the present embodiment of my invention I have found it necessary to cut away a portion of the inner circle of the cap-ring, leaving a shoulder or space, as 47, (see Fig. 17,) chiefly for the reception of a pin 48, attached to the carrier E. (See Fig. 6.)

The carrier E has pivoted upon it at 52 a pusher 53, which during the rotation of the carrier with the clamp during the stitching of the enlarged eye of the buttonhole acts upon the eccentrically-placed inner edge 45 of the cap-ring $C^{20}$, thus causing the pusher contacting with a portion of the base of the clamp at $m$ to turn or swing the clamp laterally about the pivot 28, thus changing the position of the edge to be overstitched with relation to the stitch-forming mechanism that the overedge-stitching may be made uniformly about the enlarged eye of the buttonhole.

Referring to Fig. 8, it will be seen that the ring D has a lug 54 and two notches 55 56 and that the ring has a slot 57 leading into its groove 51.

The plate $A^2$ has pivotally mounted upon it a dog 58, acted upon by a spring 59, said dog entering the notch $E'$ of the carrier E when the clamp arrives in position to receive the material in which the slit is to be made for the next buttonhole to be made, said dog acting as a guide or positioning device to determine the correct position for the clamp when the buttonhole is to be cut and when the stitching is to be commenced. The ring has a series of inclined worm-like bevel-teeth 62, which are engaged by the worm-like bevel-teeth of the pinion 63, fast on one end of the feed-shaft $C^2$, the said pinion rotating the ring D only during the stitching operation. The said shaft $C^2$, near the said gear, has a bearing 64, (see Fig. 13,) mounted loosely in a plumber-box 65, (see also Fig. 1,) the said bearing resting upon a cam 66, (shown by full lines, Fig. 13, and by dotted lines, Fig. 1,) projecting from a short rock-shaft 67, having an arm 68, acted upon by a spring 69, (also shown by full and dotted lines in said figures,) the said spring being connected to a lever $c'$ and normally holding the said bearing up in the position Fig. 13, to thus keep the said pinion in engagement with the teeth of the ring.

The clutch controlling or shipper rod $c$ is provided with a collar 82, acted upon by a suitable spring 83. (See Fig. 1.) One end of the spring abuts against said collar and the other end thereof against the hanger 84, so that said spring normally acts to move the shipper-rod to the right. The shipper-rod at its right-hand end has a suitable forked arm 85, (see Fig. 4,) which embraces the bearing-pulley $B^4$ to move it longitudinally upon the shaft B when it is desired to disengage the clutch-pulley from the shaft to leave it and the stitch-forming mechanism at rest, while the clutch-pulley and the pulley $B^4$ continue to rotate continuously through the belt $B^5$. The left-hand end, viewing Fig. 4, of the shipper-rod $c$ has jointed to it a bar $c^\times$, (see Fig. 5,) and to the extremity of this bar is jointed a trip 87, pivoted at 88.

The plate $A^2$ (see Figs. 6 and 21) receives a vertical shaft $g$, carrying at its upper end a knock-off plate $g'$, (best shown in Figs. 6, 17, and 21,) it having two notches $48^\times$ and $48^2$, said plate occupying normally the dotted-line position, Figs. 6 and 17, in which position it is held by or through the action of a spring 89, (shown in Figs. 4 and 21,) connected at one end to some fixed part of the frame and at its other end to an arm projecting from the lower end of the shaft $g$. The shaft $g$ (shown fully in Fig. 21) has a collar $g^4$, upon which is pivoted a spring-pressed latch $g^5$. Said latch as the shaft $g$ is turned in the direction of the hands of a watch travels up over a stop 90, carried by the bar $c^\times$, as shown in Fig. 1 and separately in Fig. 21, the said latch being arrested by said stop when the shaft has been partially rotated, as will be described, by or through the action of a pin 48, (see Fig. 6,) projecting from the carrier E, against the knock-off device $g'$ to bring it into its full-line position.

In the operation of overstitching the entire edge of a buttonhole the pin 48 on the carrier E passes the knock-off device twice, and were it not for this provision for giving the shaft $g$ two movements or steps to effect one complete movement or result the action of the stitch-forming mechanism would be stopped immediately after the stitching was started to overstitch the edge of a buttonhole; but by making the pin 48 enter first one notch $48^\times$ (see Fig. 21) the first movement of the shaft $g$ is a false one, and the knock-off device $g'$ is left in such position that when struck the second time by the pin 48 entering the notch $48^2$, which is done when the edge of the buttonhole has been fully overstitched, the shaft $g$ will be fully turned. When the shaft $g$ is turned the second time or fully operated by the pin 48, the pawl $g^5$ strikes a pin or projection 91, rising from a latch 92, (see Fig. 5,) pivoted at 93 and acted upon by a spring 94, and turns said latch in a direction to disengage its hooked end from that end of the lever 87 which is pivoted to the bar $c^\times$. The spring 83 acts quickly to move the rod $c$ to the right to unclutch the pulleys and let the shaft B and the stitch-forming mechanism be stopped. As the rod $c$ is moved to the right to unclutch the pulleys and stop the rotation of the main shaft and the action of the stitch-forming mechanism, said rod, through a pin or projection thereon, (see Fig. 4,) standing in a slot in the elbow-lever $c'$, turns said lever so that it releases the tension-spring 69, referred to, and permits the cam 66, sustaining the bearing 64 on the shaft $c^2$, to drop, thus moving the gear 63 out of engagement with the ring $d$, so that said ring is free to be moved through the shaft $B^7$, to be described, to actuate the clamp at a faster speed and place it in starting position, while the main shaft and the feed-shaft $C^2$ remains at rest. During this movement of the rod $c$ to the right the latch $c^{12}$, connected to the link $c^\times$, acts upon a pin or projection of a pivoted latch 4 (see Figs. 4 and 5) and moves it to release the toe 3 of a lever $B^{13}$, so that a spring $B^{12}$, connected therewith, may act to turn said lever and cause its projection $B^{15}$, acting in the groove of a hub $B^{16}$ of a sleeve $B^9$, splined on the shaft $B^7$ and having a worm $B^{10}$, to put said worm in engagement with a worm-gear $a$, (see Fig. 14,) secured to a shaft $a'$, having at its upper end a gear or pinion $a^2$. The movement of the sleeve in the direction stated starts immediately the rotation of the shaft $a'$ and causes the pinion to engage a series of teeth 60, made at the interior of the ring D, (see Fig. 18,) and turn said ring through the shaft $B^7$ into its starting position or position in which the material is changed in the clamp. The shaft $B^7$ is driven by the belt $B^5$ and rotated at a faster speed than the shaft B, which actuates the stitching mechanism or shaft $C^2$, which actuates the feeding means or ring D, and when the shaft $B^7$ moves the clamp it moves it at a faster speed than is imparted to the clamp during the overstitching of the edge of a buttonhole. The gear $a^2$ rotates the ring D backwardly for a greater or less distance, according to the number of stitches which the overedge-stitching used to complete the buttonhole overlaps the stitching made when starting the overedge-stitching of the buttonhole, and said pinion in its motion soon runs out from the teeth and enters the notch 70 thereof, where it continues to revolve, without, however, further turning the ring. On the arrival of the ring into its starting position the dog 58 engages the notch $E'$ thereof and stops the ring, but the pinion $a^3$ continues to rotate in the space 70 of the ring D, and were it not for this space it would be impossible to stop the ring and the clamp when the latter arrive in starting position. As the lever $B^{13}$ is turned by its spring $B^{12}$, the toe 2 of said lever acts on the toe 7 of the lever $B^{17}$ and turns the latter, so that its projection 103 is put within the range of movement of a pin 104, shown as extended from the under side of a link 99, connected with and forming a part of the buttonhole-cutting mechanism, to be described. The main shaft B has also fast upon it a cam $G^2$, (see Fig. 4,) which receives a roller or other stud of a lever $G^3$, pivoted at $G^4$ at the front of the machine, said lever being joined by a connecting-rod $G^5$ (shown chiefly by dotted lines in Fig. 4 and in section in Fig. 15 and partially in Fig. 1) to an arm $G^6$, secured to the shank $G^7$ of the loop-spreader $G^8$, the shank of the said loop-spreader having its bearings in a pivoted yoke $G^9$, the pivots of the said yoke, as represented in Fig. 1, being pointed screws $G^{10}$.

The shaft B has a cam H, (see Fig. 15,) which in the rotation of the shaft acts against a finger $G^{9\times}$ of and swings the yoke $G^9$ about its pivotal points, the loop-spreader thereby having given to it a motion bodily laterally, while the spreader itself is oscillated in the bearings of the yoke to take the loop of upper thread from the needle and spread it underneath the material for the entrance of the under-thread carrier or looper $f^7$. Mounting the shank of the loop-spreader in the vibrating yoke allows the point of the spreader during the lateral or return motion thereof (the looper or under-thread carrier then rising) to get out of the way of the rising looper, so that the concave side of the looper as it rises will not strike the loop-spreader. The shaft B also has upon it a cam $H^2$, which is embraced by one forked end of a lever $H^3$, pivoted at $H^4$ (see Fig. 14) on an arm of a tubular stand $H^5$, the said stand receiving a non-rotatable rod $H^6$, to the upper end of which is properly secured the throat $e$, which supports the work directly under the thrust of the needle, said throat being shown enlarged in Fig. 3. The rod $H^6$ has a pin $H^7$, which is embraced by one of the forked ends of the lever $H^3$, the said pin being extended outwardly through a slot in the guide $H^5$. The throat is kept elevated and in contact with the material at the stitching-point, while the upper thread carried by the needle is in the material, the work-clamp or work-holder then being stationary, and it is lowered, so as to release its pressure or undue friction upon the under side of the material during the feeding movement of the work-clamp, the extent of rise and fall of the throat being in practice but little. The throat referred to has suitable guide-eyes for conducting a cord or gimp $e'$ to be laid under the stitching at the edge of the buttonhole to form a body therein, and this throat has a projecting horn $e^2$, the eye-pointed needle descending at the right of the said horn viewing Fig. 3, while the looper described, carrying the under thread, rises in the space at the left of the said horn. The shaft B also has an eccentric $f$, which is embraced by an eccentric-strap $f'$, ball-jointed, as shown in Fig. 1, to an arm $f^2$ of a rock-shaft $f^3$, the said rock-shaft having an arm $f^4$, having jointed to it a link $f^5$, having at its opposite end a bearing (see Fig. 4) which receives a rod $f^6$, provided near the said bearing with a suitable block, as 81, upon which is secured the under-thread carrier $f^7$, (shown best in Fig. 19,) the said carrier being supplied with thread from a suitable source and being acted upon by a tension device $f^8$, Fig. 4, and by the take-up $G'$ referred to. This rod $f^6$ has at its opposite ends crank-arms $f^{10}$, having journal-pins $f^{12}$, which enter suitable bearings $f^{13}$, suitably secured in or forming part of the bed-plate $A^2$, so the said rod $f^6$ is free to be moved in the arc of a circle struck from substantially the plane in which the cloth or material rests while being stitched, such construction enabling the under curved needle or thread-carrier to travel in the same arc both above and below the edge of the material and obviate lateral or side movement of the carrier while in the slit, said lateral or side movement being objectionable because of straining or fraying the edges of the slitted material and being also objectionable because of producing friction upon the needle and upon its thread, thus sometimes obstructing the correct formation of the loop of under thread to be left by it above the material for the entrance of the needle. The bar 99 has connected therewith by a screw 98 a bar 95, having a cam projection 96 and a dog 97. (See Figs. 5 and 20.) The bar 99 is jointed at one end to an arm 100 of a rock-shaft 101, supported in suitable bearings and having an overhanging arm 102, provided at its outer end with a suitable cutter 103, forming one member of a buttonhole-cutting device. As the bar 99 moves in the direction of the arrow 400 the cam 96 acts on the lower end or shank of the buttonhole-cutting anvil $h$ and slides the same upwardly against the under side of the material, a suitable spring, as $h^2$, (see dotted lines, Fig. 1,) acting normally to lower the anvil when the cam bar and link are moved in the direction opposite said arrow, Fig. 5.

Assuming that the clamp is in its starting position and locked by the dog 58, the operator will put the material in the clamp and turn the lever or handle 36 to clamp the material firmly, straining it transversely with relation to what is to be the length of the buttonhole. The operator then by hand pushes the clamp in a direction to slide the same over a guide or block 27, mounted loosely on a stud 28, moving the clamp against the stress of the spring $b^4$, such movement of the clamp putting it in proper position for the cutting mechanism to act to cut a buttonhole.

The rock-shaft 101 has a backwardly-extended arm 106. (Shown in Fig. 4 and partially in Fig. 24.) This arm has attached to it a link 107, which is extended down over the edge of or below the bench 108, upon which the machine is supposed to rest when in operation, the said link being connected to a crank-pin of a disk 109, fast on a shaft 110, supported in suitable hangers 112 below the bench, the said shaft having loose upon it a pulley 113 and fast upon it at the side of the pulley 113 a tight pulley 114. The belt 115, driven from any suitable pulley 116 on any suitable counter-shaft 117, is embraced by lugs or projections of a belt-shipper 118, acted upon by a spring 119, which normally keeps the belt upon the loose pulley, which causes a projection 120 of the belt-shipper to enter a notch in and lock the pulley 114, so that the said pulley can make but one rotation, it starting after the locking device 120 has been withdrawn from the tight pulley and rotating until the notch again comes opposite the locking device, when the latter quickly enters it by or through the action of the spring 119.

To start the cutting mechanism in operation, I have provided a lever 121, having a spring-controlled dog 122 and acted upon by a rod 123, supposed to be connected at its lower end with some suitable treadle (not shown) located at the floor, a spring 124 normally acting to keep the lever 121 in the position shown in Fig. 24, and to actuate the cutting mechanism the operator will put his foot upon a suitable treadle, (not shown,) supposed to be connected with the rod 123, and will turn the lever 121, causing the dog 122 carried thereby to act upon the pin 130 of the shipper 118 and ship the belt 115 from the loose pulley 113 onto the fast pulley 114, thus starting the same and with it the shaft 110. The shaft 110 is connected by link 107 with the end of a lever 106, connected with shaft 101, with which is secured the arm 102, provided with one member 103 of the buttonhole-cutter, and the shaft 110 in its first rotation locks the shaft 101, causing an arm 100, attached thereto and connected with a link 99, to withdraw said link in the direction of the arrow 400, (see Fig. 5,) causing a cam 96, connected with the bar 95, joined at 98 to the link 99, to act on and lift the anvil $h$ into its operative position in contact with the under side of the material below the open central part of the work-clamp. During this movement of the bar 95 the pin 104 on the link 99 meets the toe 103 of the lever $B^{17}$, turning it so that the portion 7 thereof will act against the portion 2 of the lever $B^{13}$ and move the same in the direction to withdraw the worm $B^{10}$ from contact with the worm-gear $a^2$, thus stopping instantly the rotation of the shaft $a'$. In the continued movement of the rock-shaft the cutter 103 descends between the members of the work-clamp, meets the material therein, and cuts the same lying on the anvil. This done the shaft 110 in its further rotation imparts to the rock-shaft 101 a reverse movement, causing the cutter member 103 to rise and slide the link 99 and bar 95 in a direction opposite to arrow 400. During the movement of the bar 95 in this direction the pivoted dog 97, which trailed over the trip 87 while the link 99 was being moved in the direction of the arrow 400, meets the end of the trip 87 and moves the same in the direction to cause the shipper-rod $c$ to be moved to the left, viewing Figs. 1 and 4, to thus effect the clutching of the pulley $B^2$ with and so as to start into operation the shaft B and the stitch-forming mechanism. The movement of the shipper-rod to the left, as suggested, also moves the lever $c'$ and puts sufficient tension on the spring 69 to turn the cam 66 and raise the bearing 64 and the shaft $C^2$ therein, putting the shaft in engagement with the clamp-moving ring D, which immediately assumes the control of said ring and clamp for stitching a buttonhole. In this way it will be seen that the return of the cutting mechanism into its inoperative position automatically starts the stitch-forming mechanism into operation. The trip 87 therefore becomes a lever, which is automatically controlled, it being moved in one direction when released by the latch 92 by a spring to instantly stop the action of the stitch-forming mechanism, said lever being moved in a direction opposite that by which it is moved by said spring, as described, to start into operation the stitch-forming mechanism.

This invention is not intended to be limited to the exact construction of the clutch mechanism for determining the rotation or the exact periods of rotation and of rest of the main shaft, and it is also obvious that the shape of many of the parts shown may be variously modified without departing from this invention.

Before commencing to describe the action of the stitch-forming mechanism and work-clamp in the stitching of a buttonhole I will first refer to the diagram Fig. 23, showing the kind of buttonhole that the machine herein described is adapted to make, it having sides terminated by an enlarged eye.

It will be supposed that the stitching is to be started at 200, with the feed-wheel $C^4$ operative to effect the next stitch, and that feed-wheel will continue to control the movement of the work-clamp during the circular movement of the clamp or while the stitching is being carried from 200 to 201, and then the feed-wheel $C^4$ will be thrown out of operation, letting the feed-wheel $C^3$ control the intermitting movement of the shaft $C^2$ while the tapered portions of the eye from 201 to $201^\times$ and while the straight side of the buttonhole from $201^\times$ to 202 is stitched. On arriving at the end of the buttonhole at 202 the feed-wheel $C^4$ again controls the movement of the cloth-clamp while a series of stitches are made around the small end of the buttonhole-slit from 202 to 203, as represented by dotted lines, and then the feed-wheel $C^3$ again controls the movement of the clamp while the overstitching is carried on along the straight side from 203 to 204 and along the diagonal edge from 204 to 205, and on the arrival of the stitching at 205 the feed-wheel $C^4$ is again made to control the movement of the cloth-clamp while the stitching is carried about the circular part of the large eye from 205 to 206, the stitching terminating at a point between 200 and 201, so that the last stitch made in the formation of the buttonhole overlaps overedge stitching made at the starting of the buttonhole, thereby binding the buttonhole completely about its edge.

Having described the class of buttonhole which is to be made herein, I will now particularly describe the operation of the parts.

Figs. 1, 4, 5, 6, and 8 of the drawings show the parts in the position they will occupy when the machine has made some stitches about the enlarged eye of the buttonhole. To stitch a buttonhole, let it be assumed that the machine is at rest, with the work-clamp locked by its dog 58 and open, that the operator may put the material into the clamp, which done he turns the lever or handle 36 to clamp the material, and during this operation he strains the material transversely with relation to what is to be the length of the buttonhole. The buttonhole having been cut, the operator releases the clamp, letting the spring $b^4$ return it into its normal position. The cutting mechanism having been operated, on its return to its normal position starts the machine into operation, as will be hereinafter described, and the carrier E is started and the stitching is commenced at 200, the carrier deriving its movement through the action of the lug 54 upon the pin 23 of the dog $E^4$, the ring D being at such time driven by the toothed feed-wheel $C^4$ to give the longest spacing to the stitches about the circular part of the eye of the buttonhole. During the time that the stitching is to be carried on from the point 200 to 201 in order to insure the stitching on the curved part of the inner edge of the eye the clamp has to be swung about the pivot 28, and to do this the pusher 53, which at the same time rests against the straight portion $m$ of the edge of the clamp and travels against the eccentrically-located edge of the cap-ring, moves the pusher toward the needle-bar, causing it to swing the clamp about the pivot 28, the swinging movement being continued practically until in the rotation of the clamp the notch $E'$ of the carrier E comes opposite the projection $C^{13}$, this happening just as the stitching arrives at the point 201. The projection $C^{13}$, under the action of the spring $C^{21}$, immediately restrains the further rotation of the carrier E and locks out of operation the feed-wheel $C^4$ for making the longest stitches, leaving the feed-wheel $C^3$, which makes the shortest stitches, to control the movement of the shaft $C^2$, which actuates the gear D. When the carrier is first locked and restrained from rotation by the engagement of the projection $C^{13}$ with a notch $E'$, the pusher occupies a position between said projection $C^{13}$ and the carrier and the pusher yet engages the straight surface $m$ of the carrier, and the carrier having been locked the ring D in its further rotation with pin 22 of the dog $E^3$ then running in the groove 51 of the ring enables the cam-surface $b'$ of the ring to act upon the studs $b$ of the base $f$ of the cloth-clamp and slide the cloth-clamp longitudinally in the carrier. At the commencement of this sliding movement the stitch-forming mechanism operates at the point 201 and the pusher yet stands in pushing engagement with the edge $m$ of the clamp. As the sliding movement of the cloth-clamp is started the cam edge or recess 25 of the clamp in the sliding of the clamp is moved over the stationary pusher and the spring $m^4$ keeps the edge 25 of the clamp against the pusher, which causes the clamp and the material to be moved in a diagonal line, the resultant of a longitudinal and a lateral movement of the clamp, enabling the stitching to follow along the inclined part of the eye from 201 to $201^\times$. On the arrival of the stitching at the point $201^\times$ the roller 26, mounted on the carrier E, contacts with the straight edge $m^6$ of the clamp, so that thereafter during the stitching of the buttonhole from $201^\times$ to 202 the movement of the clamp is only in a straight line. The stitching having arrived at 202, the projection $D'$ of the ring D strikes the projection $C^{13}$, thus releasing the carrier E, that it may be rotated while the stitching is carried about the small end of the buttonhole from 202 to 203, the movement of the projection $C^{13}$ again causing the locking device $C^7$ to release the lever $C^5$, that it may actuate the toothed wheel $C^4$ for the longer stitches about the small end of the eye. To effect this rotation of the carrier and clamp while stitching from 202 to 203, the projection 54 of the ring D picks up and engages the pin 23 of the dog $E^4$, and on the arrival of the pin 23 opposite the notch the heel of the dog enters the notch 125 and lets the pin 23 pass to one side, so that the projection 54 may leave that dog and contact at the proper time with the pin 22 of the dog $E^3$ when the carrier is to be again rotated. The dog $E^4$ rests only momentarily in the notch 125, for the reason that in the further movement of the ring D the point 131 thereof immediately meets the pin 23 and causes the same to again enter the groove 51. As the projection 54 disengages itself from the pin 23 of the dog $E^4$ the projection $C^{13}$ is again made to enter a notch in the carrier, the notch entered this time being the notch $E^2$, opposite the notch $E'$. As soon as the projection $C^{13}$ enters the notch $E^2$ the carrier is restrained and the sliding movement of the cloth-clamp in the opposite direction is commenced again by the action of the cam-face $b'$ of the ring D. When starting to move the cloth-clamp in the direction to stitch from the point 203 to 204, the roller 26, referred to, occupies a position in contact with the straight part $m^6$ of the clamp and the pusher 53 is inactive. As the ring D moves the work-clamp in a direction opposite the arrow $m'$, Fig. 6, and while the straight edge $m^6$ of the clamp contacts with the stud 26 the straight side of the buttonhole is stitched from 203 to 204, and then to provide for stitching the inclined part of the eye from 204 to 205 the cam $m^2$ at the edge of the clamp again comes into operation, or, in other words, that edge of the clamp is made to contact progressively with the roller 26 under the action of the spring $b^4$, which gradually swings the clamp in the direction opposite the arrow 29, Fig. 6, and on the arrival of the stitching at the point 205 the pusher meets the straight projection $m$ of the clamp, and the projection $D'$ of the ring D meets and moves the projection $C^{13}$ to release the carrier, and the projection 54, which has been inactive during the running of the ring while the clamp was being slid longitudinally, comes into position and engages the projection 22 of the dog $E^3$ and again starts the rotation of the carrier, it rotating the clamp, and during this rotation of the carrier the pusher meets the eccentrically-located edge of the cap-ring, which swings the clamp about the stud 28 while the stitching of the circular large end of the eye is carried on from 205 to 206.

In the operation of stitching a buttonhole the under needle or thread-carrier carrying the under or second thread will rise through the slit cut by the cutting mechanism and pass over the edge of the material, presenting a loop of its thread at the upper side of the material, and the needle carrying the upper thread will descend through the loop of under thread held above the material and will penetrate the material back from its edge for the distance desired for the depth-stitch, the under-thread carrier in the meantime descending or moving back through the slit to the under side of the material, leaving a loop of under thread about the shank of the needle. The needle having passed below the material sufficiently to form a loop in its thread, the loop-spreader $G^8$ takes the loop of needle-thread and carries it across the buttonhole-slit, opening the loop of needle-thread in the path of movement of the under-thread carrier, so that as the latter again rises it will pass through the spread or opened loop of needle-thread. During the operation of spreading the loop of needle-thread the needle-bar is made to rise rapidly, so that it gets out of the way of the under-thread carrier as the latter rises through the spread or opened loop of needle-thread, said carrier again presenting its thread above the material, as before, to be engaged by the needle at its next descent. During this operation of stitching, the gimp or cord $e'$ is laid upon the edge of the material and is inclosed between the loops of the two threads referred to, all in usual manner, the stitch made being one commonly produced in buttonhole-sewing machines. During the stitching of the small end of the buttonhole-slit the carrier is turned for a distance of substantially one hundred and eighty degrees; but the sum of the two circular movements of the clamp and the carrier instrumental in stitching the large part of the eye rotate the clamp for a distance greater than one hundred and eighty degrees. During the partial rotation of the carrier while stitching from 200 to 201 the pin 48 of the carrier 47 acted upon the knock-off $g'$, it entering the recess $48^\times$ thereof, and turns the knock-off from its dotted-line position, Fig. 6, into its full-line position, thus carrying the latch $g^5$ past the stop 90. The stitching having been carried to about the point 206, the projection 48 in the rotation of the carrier E strikes for the second time the knock-off $g'$, it entering the notch $48^2$ and turning the shaft G far enough to cause its pawl or projection $g^5$ to strike the pin 91 and cause the latch 92 to release the lever 87, so that the spring 83, operating on the rod $c'$, may move the latter in the direction to cause the latch $c^{12}$, acting on a pin of the latch 4, to release the toe 3 of the lever $B^{13}$, so that the spring $B^{12}$ may immediately slide the collar $B^9$ up and put the worm $B^{10}$ into engagement with the worm $a$ on the shaft $a'$, so that the pinion $a^2$ in engagement with the teeth 60 of the ring D will be immediately made to turn the said ring D at a faster speed and by a substantially continuous motion backwardly or in the direction opposite that in which it has been previously rotated; but just before the said pinion $a^2$ commences to reverse the rotation of the said ring the stress of the spring 69 is released, as before stated, thus permitting the shaft $C^2$ to drop and disengage the teeth of the gear 63 from the teeth 62 of the ring D. It will be remembered that the shaft $B^7$ is rotated continuously, even when the stitch-forming mechanism is at rest.

The ring D is provided with two projections 55 56, one of which comes into operation during its reverse movement, said ring as it is reversed catching a bevel-pin n, (see Fig. 9,) carried, preferably, by a spring 141, the spring being employed and the projection being beveled, so that when the ring works in the opposite direction the projection 55 or 56 will not become effective. When the ring D has been brought back into its starting position, the dog 58 enters the notch E', thus preventing the overrunning of the ring or its movement beyond that point due to momentum. Viewing Fig. 6, it will be seen that the notch E' is just in advance of the said dog 58, as it was assumed in starting that said figure showed that a few stitches had been made in the circular large end of the buttonhole. It will be noticed that the main shaft B and the needle-bar-operating shaft are rotated positively and in unison at exactly the same speed by the chain, the employment for such purpose of a chain coöperating with sprocket-wheels on the said shafts insuring accurate timing of the two shafts, more correct timing than can be given by any other mechanical means known to me without the expenditure of a large amount of friction and at a greater cost in mechanical appliances. This chain is also of the greatest possible advantage in a machine run at high speed, for the ordinary jar due to the employment of ordinary cranks and links employed to connect a lower shaft with a needle-bar shaft is entirely done away with, and the machine may be run at high speed with less power and less vibration and with less noise. In fact, the chain is substantially noiseless and is very durable.

I am aware that a sprocket-chain has been employed in many different classes of machines to rotate two shafts; but in the present instance the chain is productive of great advantages, and its combination with the stitch-forming mechanism of a sewing-machine produces a very much improved machine.

I am aware that an under-thread-carrying looper adapted to be moved from below up through the buttonhole-slit has been carried by an arm pivoted on a horizontal pivot located slightly below the under side of the bed-plate of the machine, on which rests and moves the cloth-clamp; but in this my invention the pivotal points about which the looper vibrates are located substantially in the plane occupied by the cloth or material being stitched, and this peculiar location of the pivots obviates the lateral pushing or straining of the buttonhole-slit, which in my judgment would be quite injurious in case the pivotal points were located below the cloth-plate or bed of the machine. Further, by connecting the carrier for the looper with a rod or shaft having bearings at both ends it is possible to get a much steadier movement than could be gained if the said shaft was supported only at one end.

Having fully described my invention, what I claim as new, and desire to secure by Letters Patent, is—

1. In a machine for stitching buttonholes, stitch-forming mechanism comprising a reciprocating eye-pointed needle, and complemental means coöperating therewith to form a series of overedge-stitches, a work-clamp to hold the material having the slit to be overstitched entirely about its edge, means to change automatically the relative positions of said work-clamp and stitch-forming mechanism, whereby overedge-stitches are made at both ends of the buttonhole-slit and at both sides thereof, the overedge-stitching which completes the stitching of the buttonhole overlapping overedge-stitching made when starting the buttonhole.

2. In a machine for stitching buttonholes, stitch-forming mechanism comprising a reciprocating eye-pointed needle, and complemental means coöperating therewith to form a series of overedge-stitches, a work-clamp to hold the material having the slit to be overstitched entirely about its edge, means to change automatically the relative positions of said work-clamp and stitch-forming mechanism, whereby overedge-stitches are made at both ends of the buttonhole-slit and at both the sides thereof, the overedge-stitching which completes the stitching of the buttonhole, overlapping overedge-stitches made when starting the buttonhole and means to stop automatically the stitch-forming mechanism when the buttonhole has been completed by the overlapping of the overedge-stitching.

3. In a machine for stitching buttonholes, stitch-forming mechanism comprising a reciprocating eye-pointed needle, and complemental means coöperating therewith to form a series of overedge-stitches, a work-clamp to hold the material having the slit to be overstitched entirely about its edge, means to change automatically the relative positions of said work-clamp and stitch-forming mechanism, whereby overedge-stitches are made at both ends of the buttonhole-slit and at both sides thereof, the overedge-stitching which completes the buttonhole overlapping overedge-stitching made when starting the buttonhole, means to stop automatically the stitch-forming mechanism after the overedge-stitching has been overlapped, and means to thereafter continue to further change the relative positions of the work-clamp and stitch-forming mechanism at a faster speed than when overedge-stitching is being done and while the needle of the stitch-forming mechanism is out of the work, to locate the clamp in the position it must occupy for the removal of the material therefrom containing the buttonhole.

4. In a machine for stitching buttonholes, stitch-forming mechanism consisting of a reciprocating eye-pointed needle, and complemental means coöperating therewith to form a series of overedge-stitches, a work-clamp to hold the material having the slit to be overstitched entirely about its edge, means to change the relative positions of said work-clamp and stitch-forming mechanism whereby both ends of the buttonhole-slit, one end having an enlarged eye, and the sides of the slit may be overstitched, the overedge-stitching which completes the bottonhole overlapping the stitching made when starting the buttonhole, and means to cut the material held in the clamp preparatory to stitching the same.

5. In a sewing-machine for stitching buttonholes, stitch-forming mechanism comprising a reciprocating eye-pointed needle, and complemental means coacting therewith to form a series of overedge-stitches, a work-clamp to hold the material having the slit to be overstitched, means to partially rotate the work-clamp while overstitching each end of a buttonhole, said partial rotations being in the aggregate more than a full rotation during the stitching of each buttonhole, whereby the overedge-stitching which completes the buttonhole is made to overlap overedge-stitching made to start the buttonhole.

6. A sewing-machine containing the following instrumentalities, viz: stitch-forming mechanism comprehending an eye-pointed needle and an under-thread-carrying looper, means to actuate the same to form overedge-stitches, a work-clamp to hold the material, a carrier to sustain said clamp, means to move said clamp longitudinally in said carrier while the side edges of the buttonhole are being stitched, and means to partially rotate said carrier and work-clamp while overstitching each end of a buttonhole, said partial rotations being for more than a full rotation during the stitching of each buttonhole, whereby the overedge-stitching which completes the buttonhole is made to overlap overedge-stitching made to start the buttonhole.

7. In a buttonhole-stitching machine, a work-clamp, stitch-forming mechanism, and means to change the relative positions of said clamp and stitch-forming mechanism to enable overedge-stitches to be made entirely about the edge of the buttonhole, the last of the overedge-stitching overlapping the overedge-stitching made at the point where the stitching was commenced.

8. In a machine for stitching buttonholes, stitch-forming mechanism consisting of a needle to penetrate the material, and complemental means coacting therewith to form a series of overedge-stitches, a work-clamp, means to slide the work-clamp while the stitch-forming mechanism makes a series of overedge-stitches along the sides of the buttonhole, means to change the relative positions of the work-clamp and stitch-forming mechanism rotatively while the stitch-forming mechanism is operating to make a series of overedge-stitches radiating about both ends of the buttonhole, the stitching that completes the overedge-stitching of the buttonhole overlapping overedge-stitching made when the stitching of the buttonhole was commenced.

9. In a machine for sewing buttonholes, overedge-stitch-forming mechanism, a carrier, a plate slidably mounted therein, a work-clamp pivoted on said plate, means to engage said carrier a plurality of times to effect a partial rotary movement of said carrier and clamp during the overstitching of both ends of a buttonhole, means to slide said clamp in said carrier between partial rotations of the carrier, and means to swing said clamp on said plate during the time that the large eye of the buttonhole is being overstitched.

10. In a machine for stitching buttonholes, stitch-forming mechanism comprising an eye-pointed needle to penetrate the material, and complemental means coacting therewith to form a series of overedge-stitches, a work-clamp to contain the material having the buttonhole the edge of which is to be overstitched, means to change the relative position of said work-clamp and stitch-forming mechanism while a series of overedge-stitches is being made along both sides of and about both ends of the buttonhole-slit, means to stop the action of the stitch-forming mechanism when the buttonhole has been overstitched, and means to thereafter move the work-clamp at a faster speed to place said clamp in the position from which it was started when the overstitching of the edge of the buttonhole was begun.

11. In a machine for stitching material, stitch-forming mechanism comprising an eye-pointed needle to penetrate the material, and complemental means coacting therewith to form a series of overedge-stitches, means to clamp the material having the edge to be overstitched, and means to change the relative position of the said work-clamp and stitch-forming mechanism for a cycle of movements, and means to stop the action of the stitch-forming mechanism at the completion of the cycle of movement, the stitch-forming mechanism during each cycle of movement overstitching the beginning of the line of stitching before said stopping mechanism acts.

12. In a machine for stitching buttonholes, stitch-forming mechanism comprising an eye-pointed needle to penetrate the material back of the edge of the slit therein, and complemental means working through said slit and coacting with the eye-pointed needle to form a series of overedge-stitches, a work-clamp, means to change the relative position of said work-clamp and stitch-forming mechanism at one speed while overstitching the side edges of a buttonhole-slit, means to change the relative position of said parts at a faster speed while stitching both ends of the buttonhole-slit, means to stop the stitching action of the stitch-forming mechanism, and means to thereafter continue said rotative change of position of said work-clamp and stitch-forming mechanism at a yet faster speed while the stitching action is suspended to thereby put the work-clamp in its starting position for change of material therein.

13. In a machine for stitching buttonholes, overedge-stitch-forming mechanism, a work-clamp, a plate upon which said work-clamp is pivotally mounted, means to move said work-clamp longitudinally while stitching the sides of a buttonhole, means to rotate said clamp partially while stitching the large eye of the buttonhole, and means to swing said clamp on said plate while stitching about the large eye of the buttonhole, and while the stitching at the sides of the buttonhole is approaching and leaving said large eye.

14. In a sewing-machine, for sewing buttonholes, overedge-stitch-forming mechanism a carrier, a plate, a work-clamp mounted on said plate and free to be slid longitudinally in said carrier, a pusher, means to rotate said carrier and slide said plate therein at intervals, and a ring having an eccentric inner edge to act upon said pusher to swing the work-clamp on said plate while stitching about the eye of a buttonhole.

15. In a buttonhole-sewing machine, a work-clamp having at one edge straight and concaved portions, a plate having a pivot to sustain the work-clamp, a spring connecting said plate and clamp, and a carrier slotted to receive and guide the plate upon which the work-clamp is mounted, said carrier being provided with a stud against which the straight and concaved portions of said clamp act while stitching the sides of a buttonhole near the enlarged eye at one end thereof.

16. In a machine for sewing buttonholes, a rotatable carrier slotted centrally and provided at one side of said slot with a stud, a plate entering the slot of the carrier, and having pivoted upon it a work-clamp provided with a cam-shaped edge, means to move said plate and clamp in said carrier, a spring to keep the cam-shaped edge of the work-clamp in contact with said stud, the stud and spring controlling the extent of lateral swinging movement of the clamp on the plate during the stitching of the sides of a buttonhole near the enlarged eyed end thereof.

17. In a buttonhole-stitching machine, stitch-forming mechanism for making an overedge-stitch, a work-clamp to hold the slitted material the edge of which is to be overstitched, means to partially rotate said clamp when the buttonhole-stitching is commenced, means to thereafter restrain the rotation of said clamp and slide the same in the direction of the length of the buttonhole when one side of the buttonhole is being stitched, means to again partially rotate the clamp while one end of the buttonhole is being stitched, and again move the clamp in the direction of the length of the buttonhole while the opposite side edge of the hole is being stitched, and again impart circular movement to the work-clamp in the same direction while the end of the buttonhole at which the stitching was started is completely stitched around to a point beyond the point where the stitching was started.

18. In a buttonhole-stitching machine, stitch-forming mechanism to form a series of overedge-stitches, a work-clamp to hold the material having the buttonhole to be overstitched, a clamp-actuating ring provided with a series of teeth, a shaft having a toothed gear to engage the teeth of said ring to move the same during the overstitching of the edge of the buttonhole, and means to uncouple said gear from the teeth of said ring when the overstitching of the buttonhole has been carried completely about the edge thereof.

19. In a buttonhole-stitching machine, stitch-forming mechanism to form a series of overedge-stitches, a work-clamp to hold the material having the buttonhole to be overstitched, a clamp-actuating ring provided with a series of teeth, a shaft having a toothed gear to engage the teeth of said ring to move the same during the overstitching of the edge of the buttonhole, means to uncouple said gear from the teeth of said ring when the overstitching of the buttonhole has been carried completely about the edge thereof, and means to engage said ring and move the same that it may carry the clamp holding the stitched buttonhole into position to receive the material.

20. In a buttonhole-stitching machine, stitch-forming mechanism, a work-clamp occupying normally a starting position, means to turn said clamp in one direction while overstitching a buttonhole, a carrier for said clamp, a toothed ring, a shaft having a pinion adapted to engage said toothed ring and having a worm-gear, combined with a shaft having a worm, devices to cause said worm to engage said worm-gear and rotate the shaft upon which it is mounted to turn backwardly said toothed ring and return the work-clamp into its starting position, and means to thereafter disengage said worm from said gear and leave said shaft at rest with the clamp in its starting position.

21. In a buttonhole-sewing machine, a work-clamp, a toothed ring to move said clamp while stitching a buttonhole, said ring having a series of inner teeth, a shaft having a pinion to engage said teeth, and a worm-toothed gear, said pinion and shaft occupying their inoperative position while stitching a buttonhole, a sleeve having a worm, and means to automatically move said sleeve that its worm may engage the said worm-gear and rotate said shaft and pinion that it may rotate the said toothed ring backwardly and cause it to return the work-clamp into its starting position.

22. In a machine for stitching buttonholes, stitch-forming mechanism, a work-clamp, a carrier for said clamp, a ring having two series of teeth, a cam to move said clamp longitudinally in said carrier, means engaging one series of said teeth to move the said ring in one direction while stitching a buttonhole, means to engage automatically the other of said series of teeth after the completion of a buttonhole to further turn said ring and clamp automatically into its starting posisition, and means to stop the shaft and ring after the clamp has been brought to its starting position.

23. In a buttonhole-sewing machine, a carrier, a clamp therein, a toothed ring having gear-teeth, a series of bevel-teeth, a beveled toothed gear to engage said bevel-teeth and rotate said ring in one direction during the stitching of a buttonhole, a shaft having a pinion engaging the gear-teeth of said ring and moved by the ring during the stitching of a buttonhole, means to disengage the teeth of the bevel-gear from the bevel-teeth of said ring after stitching a buttonhole, and devices to thereafter automatically engage and rotate the shaft carrying the said pinion in a direction to reverse the movement of said toothed ring, together with said carrier and work-clamp to bring the clamp into its normal starting position after the completion of a buttonhole.

24. In a sewing-machine for stitching buttonholes, the following instrumentalities, viz: stitch-forming mechanism, a rotating work-clamp actuating-ring provided with a series of teeth, a work-clamp, and carrier, a rotating shaft and gear to engage the teeth of said ring and rotate it forwardly while a buttonhole is being stitched, a series of internal teeth also made in said ring, a rotating shaft provided with a pinion to engage said internal teeth to put the clamp into its starting position.

25. In a sewing-machine for stitching buttonholes, stitch-forming mechanism, a work-clamp, a carrier in which it is mounted to slide, a toothed ring, a shaft to actuate said ring to move said carrier and clamp during the stitching of a buttonhole, means to stop the stitch-forming mechanism when the entire edge of the buttonhole has been overstitched, a clutch on said shaft containing as part thereof a continuously-running pulley, a second shaft driven from said continuously-running pulley when the shaft operating said work-clamp and its carrier is at rest, and actuating means between said second shaft and said toothed ring to further turn said ring to place the work-clamp in its starting position while the stitch-forming mechanism is at rest.

26. In a machine for stitching buttonholes, stitch-forming mechanism to form overedge-stitches, a work-clamp to hold the material, means to rotate said clamp partially at intervals and to move said clamp longitudinally between said partial rotations, and means to stop the action of the stitch-forming mechanism after the overedge-stitching at both ends of the buttonhole crosses the center line of the slit.

27. In a buttonhole-sewing machine, stitch-forming mechanism, a rotatable carrier having opposite notches or projections at its edge, and containing a sliding work-clamp, a table-plate to sustain said carrier, holding means to engage one after the other the notches or projections of the carrier to restrain its rotation while the straight sides of the buttonhole are being stitched; a toothed ring having a projection; a shaft having an attached gear to rotate said ring; means to move said shaft at two different rates of speed while stitching a buttonhole, the said shaft having its slower speed while the sides of the buttonhole are being stitched the projection of said ring meeting said holding means and putting out of operation the slower shaft-moving means after stitching each side of a buttonhole letting the faster-moving means come into operation while the rounded ends of the buttonhole are being stitched.

28. In a machine for stitching buttonholes, a work-clamp, buttonhole-cutting mechanism, and stitch-forming mechanism; combined with means controlled by said cutting mechanism to automatically start the stitch-forming mechanism into operation after the cutter has been actuated to do its work.

29. In a machine for sewing buttonholes, a work-clamp, buttonhole-cutting mechanism to cut a buttonhole and remove a portion of the material to leave an enlarged eye at one end of the hole, stitch-forming mechanism, and means to change the relative positions of said clamp and stitch-forming mechanism to enable overedge-stitches to be made entirely about the edge of the buttonhole, the last of the overedge-stitching overlapping the overedge-stitching made at the point where the stitching was commenced.

30. In a machine for stitching buttonholes, a work-clamp, buttonhole-cutting mechanism to cut a buttonhole in the material held in the clamp, stitch-forming mechanism, means to change the relative positions of said clamp and stitch-forming mechanism to enable overedge-stitches to be made entirely about the edge of the buttonhole, the last of the overedge-stitching overlapping the overedge-stitching made at the point where the stitching was commenced, and means to stop the stitch-forming mechanism when the overedge-stitching has been overlapped.

31. In a machine for stitching buttonholes, a work-clamp, buttonhole-cutting mechanism to cut a buttonhole in the material held in the clamp, stitch-forming mechanism, means to change the relative positions of said clamp and stitch-forming mechanism to enable radiating overedge-stitches to be made entirely about the edge of the buttonhole, means to stop the stitch-forming mechanism when the entire edge of the buttonhole including its sides and both ends have been overstitched by radiating stitches, and means to thereafter further move relatively the clamp and stitch-forming mechanism while the latter is inoperative to place the clamp in starting position ready for the stitching of another buttonhole.

32. In a machine for stitching buttonholes, a work-clamp, buttonhole-cutting mechanism to cut a buttonhole, stitch-forming mechanism to form a series of overedge-stitches, means controlled by the cutting mechanism to start into operation the stitch-forming mechanism, means to change the relative positions of said clamp and stitch-forming mechanism, whereby the stitching along the sides of the buttonhole is made at one speed, the overedge-stitching about the ends of the buttonhole being made at an increased speed, means to stop the stitch-forming mechanism at the completion of the overedge-stitching, and means to thereafter further change the relative positions of the work-clamp and stitch-forming mechanism while the stitch-forming mechanism remains inactive to place the work-clamp holding the stitched buttonhole in the position at which the material was applied to the clamp to be stitched.

33. In a machine for stitching buttonholes, a work-clamp, buttonhole-cutting mechanism to cut a buttonhole, stitch-forming mechanism to form a series of overedge-stitches, means controlled by the cutting mechanism to start into operation the stitch-forming mechanism, means to change the relative positions of said clamp and stitch-forming mechanism, whereby the stitching along the sides of the buttonhole is made at one speed, the overedge-stitching about the ends of the buttonhole being made at an increased speed, means to stop the stitch-forming mechanism at the completion of the overedge-stitching, means to thereafter further change the relative positions of the work-clamp and stitch-forming mechanism while the stitch-forming mechanism remains inactive to place the work-clamp holding the stitched buttonhole in the position in which it received the material to be stitched, and means to lock the clamp in its position to receive the material.

34. In a buttonhole-sewing machine, stitch-forming mechanism adapted to make overedge-stitches, a work-clamp, means to change the relative positions of said stitch-forming mechanism and work-clamp in the overstitching of the edge of a buttonhole, clutch mechanism, buttonhole-cutting mechanism, and devices controlled by the return into its inoperative position of the buttonhole-cutting mechanism to operate the clutch mechanism and start the stitch-forming mechanism into operation.

35. In a machine for stitching buttonholes, stitch-forming mechanism adapted to make overedge-stitches, and having as a part thereof a throat-plate adapted to be raised and lowered with relation to the material being stitched, a work-clamp, buttonhole-cutting mechanism the lower member of which occupies normally a position at one side the throat-plate of the stitch-forming mechanism and with its face below the face of said throat-plate, said work-clamp being adapted to be put into position between the members of said cutting mechanism and out of stitching position, means to actuate said cutting mechanism to cut the material in the clamp, means to return the clamp into stitching position after cutting the material therein, and means to start the stitch-forming mechanism automatically after the cutting of the buttonhole, and means to change the relative positions of said work-clamp and stitch-forming mechanism to make a series of overedge-stitches.

36. In a buttonhole-sewing machine, stitch-forming mechanism for producing overedge-stitches, a work-clamp, means to lock said clamp in the position in which the work is to be changed therein, a spring acting normally to keep said work-clamp in its operative position for stitching a buttonhole, and cutting mechanism, said clamp being free to be slid longitudinally against said spring to put the clamp in position to have the material held by it cut by the buttonhole-cutting mechanism, and devices actuated by the cutting mechanism when coming into its inoperative position to start into operative position the stitch-forming mechanism.

37. In a buttonhole-sewing machine, a table-plate, a carrier rotatably mounted in said table-plate and provided at its edge with a notch, a work-clamp slidably mounted in said carrier, buttonhole-cutting mechanism, a dog to enter the notch of the carrier to restrain its rotation while the work-clamp is moved longitudinally in said carrier to place the material held therein between the members of the buttonhole-cutting mechanism that the latter may be operated to cut a slit in the material.

38. In a sewing-machine for stitching buttonholes, a carrier, a clamp mounted therein, a work-clamp-actuating toothed ring, a bevel-gear engaging the said toothed ring, a shaft carrying said bevel-gear, two sets of shaft-actuating devices for rotating the shaft carrying said bevel-gear, the first set being adapted to move said shaft intermittingly for a greater distance at each throw than the second set, a locking device for the first set of shaft-actuating devices, and controlling devices controlled by said ring to cause said locking device to operate while the second set of said devices operates to move the ring and clamp in stitching the straight sides of a buttonhole, said ring when the ends of the buttonhole are to be stitched permitting said devices to be moved to unlock said first set of shaft-actuating devices to turn said shaft and the said toothed ring at a faster speed during the operation of stitching about the ends of a buttonhole.

39. In a sewing-machine, the following instrumentalities, viz: a work-clamp to hold the material, a rotatable carrier in which the said work-clamp may slide, stitch-forming mechanism, a shaft for effecting the rotation of said carrier, two sets of actuating devices for operating said shaft, one set moving said shaft for a greater distance at each stitch than the other set, and means to effect the locking out of operation, while stitching the straight sides of a buttonhole of the said actuating devices for moving said shaft its greatest distance, said actuating devices, however, moving said shaft while the overedge-stitching is carried about the ends of the buttonhole, whereby the stitching of the sides of the buttonhole may be effected by a short stitch and about the eye by a longer stitch.

40. In a buttonhole-sewing machine, stitch-forming mechanism, a work-clamp adapted to hold stretched the material in which the buttonhole is being stitched throughout the stitching operation, means to move said work-clamp while holding the material to feed the same, combined with a throat-plate normally supporting the material within the open central portion of said closed clamp during the stitching operation, and means to lower said throat-plate from contact with the material during the feeding operation, thereby relieving the material from the friction of the throat-plate.

41. In a buttonhole-sewing machine, the combination with a work-clamp adapted to hold in a stretched condition the material having the buttonhole to be stitched, means to move the said clamp stitch after stitch; a needle-bar, an attached needle, actuating mechanism for said needle-bar, a complemental under-thread carrier; a throat-plate, a vertically-movable rod to the upper end of which said throat-plate is secured, means to reciprocate said rod to lower and raise the throat-plate, the said throat-plate being lowered while the needle is out of the material and the work-clamp is being moved to feed the material, and being raised while the needle is in the material.

42. In a buttonhole-sewing machine, the following instrumentalities, viz: stitch-forming mechanism; a work-clamp to hold in stretched condition the material containing the buttonhole to be stitched, means to move said clamp intermittingly to enable the stitching to be made about the sides of the buttonhole; a throat-plate located below the work-clamp and having holes to receive and guide a cord; and means to raise and lower said throat-plate.

43. In a buttonhole-sewing machine, overedge-stitch-forming mechanism, a clamp to hold the material, and means to change the relative positions of said stitch-forming means, and work-clamp, during the stitching of a buttonhole; combined with a vertically-movable anvil arranged below said clamp; a cutter-carrier, having an attached cutter; and actuating devices for said cutter-carrier, said actuating devices having means to act on and move said anvil against the under side of the material held in the clamp during the descent of the cutter-carrier.

44. In a buttonhole-sewing machine, stitch-forming mechanism, a rotatable carrier having a plurality of notches, a plurality of dogs mounted on said carrier, locking means to enter said notches one after the other in the formation of a buttonhole to restrain at such times the rotation of the carrier, a work-clamp slidably mounted in said carrier, and a device to engage and then retire from one of said dogs after the other to effect partial rotation of the carrier and work-clamp while stitching about the ends of a buttonhole, partial rotation of the carrier and clamp taking place after stitching each straight side of the buttonhole.

45. A work-clamp, stitch-forming mechanism to form a series of overedge-stitches about the edge of a buttonhole, a work-clamp to hold the material containing said buttonhole, a rotating work-clamp-actuating cam-ring having a toe D' and a groove provided with an open space 57 and projections 55 and 56 in said groove, and having a lug 54 crossing a part of said groove, a raceway-plate having openings $C^{14}$ and a notch 125, a circular carrier open at its center to receive and guide the work-clamp that it may be slid therein, said carrier having at its edge a plurality of notches and a plurality of pivoted dogs, each dog having at its under side a projection to enter the groove of said cam-ring, a projection $C^{13}$ acting normally against the edge of said carrier and adapted to enter one or the other of the notches in the edge of said carrier when the said notches come opposite said projection, the toe D' forcing the projection from one and the other of said notches at the desired times.

46. In a buttonhole-stitching machine, stitch-forming mechanism to make a series of overedge-stitches about the entire edge of a buttonhole, a work-clamp, means to move the clamp while the edge of the buttonhole is being overstitched, a clutch in operative engagement with a shaft for operating the stitch-forming mechanism to make stitches, devices made operative immediately after the completion of the overedge-stitching to move said clutch and stop the stitching, and automatically-controlled means to thereafter further move said work-clamp at a faster speed into its starting position.

47. In a machine for stitching buttonholes, overedge-stitch-forming mechanism, a cloth-clamp to grasp between its members and hold the material to be overstitched, a plate on which the base of said clamp is pivoted, means to move said plate and clamp longitudinally during the stitching of the edges of the buttonhole, and means to move one end of said clamp laterally on said movable plate during the stitching of the enlarged eye of the buttonhole.

48. In a machine for stitching buttonholes, overedge-stitch-forming mechanism, a cloth-clamp, means for giving a relative rotary movement to the said stitch-forming mechanism and cloth-clamp during the overedge-stitching of both ends of the buttonhole, means to move said clamp longitudinally during the overstitching of the edges of the buttonhole, and means to move one end of said clamp laterally during the stitching of the enlarged eye of the buttonhole.

49. In a machine for stitching buttonholes, stitch-forming mechanism, a work-clamp, buttonhole-cutting mechanism, means to start the cutting mechanism into operation to cut the material held in the clamp, and means controlled by the cutting mechanism to start automatically the stitch-forming mechanism into operation after the completion of the cutting operation.

50. In a buttonhole-stitching machine, a cloth-clamp, means to sustain it, a cutter located above the cloth-clamp, means to carry the cutter, stitch-forming mechanism to make an overedge-stitch, a throat-plate, an anvil, and means to move the throat-plate and anvil each into and out of contact with the under side of the material held in the clamp, the anvil occupying its operative level under the material held by the clamp only when the material is to be cut preparatory to stitching the same, the throat-plate being moved into its operative position to contact with the material only when the stitch-forming mechanism is operating to overstitch the edge of the buttonhole.

51. In a buttonhole-stitching machine, stitch-forming mechanism to form overedge-stitches, a cloth-clamp to hold the material to be stitched, means to change the relative position of said stitch-forming mechanism and cloth-clamp to enable stitches to be formed about the edges of a buttonhole-slit, a vertically-movable cutter, and an anvil, both occupying normally inoperative positions out of contact with the material held by the clamp, means to move vertically automatically said anvil into its operative position to contact with the material held by the clamp, and move said cutter to coact with said anvil and cut the material held in the clamp, and means to thereafter restore said cutter and anvil to their inoperative position and maintain them in such position until again to be actuated to cut the material for another buttonhole.

52. In a machine for stitching buttonholes, stitch-forming mechanism to form overedge-stitches, a work-clamp to hold the material to be cut and stitched, means to change the relative positions of said stitch-forming mechanism and work-clamp to effect the stitching of the edges of a buttonhole, buttonhole-cutting mechanism comprising a blade and an anvil, each occupying normally their inoperative positions out of contact with the material, a shaft, connections between said shaft and cutting mechanism, a continuously-moving pulley, means to couple said pulley with said shaft whereby the same is started and the anvil put in its operative position next the under side of the material held in said clamp, and the cutter actuated to cut the material resting above said anvil.

53. In a buttonhole-stitching machine, stitch-forming mechanism, a cloth-clamp to receive the material to be cut and stitched, buttonhole-cutting mechanism, a shaft sustained outside the frame carrying the stitch-forming mechanism, said shaft actuating said cutting mechanism, manually-controlled means for causing the cutting mechanism to act and cut the material in the clamp and return the buttonhole-cutting mechanism into its inoperative position, and automatically-actuated means to start into operation the stitch-forming means after the buttonhole-cutting means has been operated.

54. In a buttonhole-stitching machine, stitch-forming mechanism, a cloth-clamp to receive the material to be cut and stitched, buttonhole-cutting mechanism, an independent shaft located below the bench sustaining the stitching mechanism, means independent of the stitching mechanism for operating said shaft, and manually-controlled means to cause the buttonhole-cutting mechanism to act but once, and then come to a position of rest.

55. In a machine for stitching buttonholes, stitch-forming mechanism, means to actuate the same to form overedge-stitches, means to sustain the stitch-forming mechanism, a work-clamp to hold the material, means to change the relative positions of the work-clamp and the means sustaining the stitch-forming mechanism, whereby overedge-stitches are made about the edge of the buttonhole, means to stop automatically the action of the stitch-forming mechanism when the buttonhole has been fully stitched, and means, including a worm, a worm-gear, and a shaft having a toothed wheel to thereafter continue automatically the relative change of position of said work-clamp and the means sustaining the stitch-forming mechanism until the work-clamp and the means for sustaining the stitch-forming mechanism occupy their positions in which the work is removed from and other work applied to the work-clamp.

56. In a machine for stitching buttonholes, stitch-forming mechanism, means to sustain the same, means to actuate the stitch-forming mechanism to form overedge-stitches, buttonhole-cutting mechanism, a work-clamp to receive the material, means to actuate the buttonhole-cutting mechanism to cut the material in the clamp, means to start into operation the stitch-forming mechanism, means to change the relative positions of the work-clamp, and means for sustaining the stitch-forming mechanism that the stitch-forming mechanism may stitch fully about the edge of the slit cut in the material, means to stop the stitching action of the stitch-forming mechanism when the said slit has been overstitched, and means to continue at a faster speed the relative change of position of said work-clamp, and means for sustaining the stitch-forming mechanism while the stitch-forming mechanism is inactive as to making stitches until the said work-clamp and means for sustaining the stitch-forming mechanism again occupy the position in which the work may be removed from the clamp and other work inserted in the clamp.

57. In a buttonhole-stitching machine, stitch-forming mechanism, a work-clamp adapted to hold stretched the material in which the buttonhole is being stitched throughout the stitching operation, means to change the relative positions of said work-clamp and stitch-forming mechanism while making over-edge-stitches about the edge of the buttonhole-slit, combined with a throat-plate normally supporting the material within the open central portion of said closed clamp while the needle is penetrating the material, and means to lower said throat-plate from contact with the material while the needle is out of the material.

In testimony whereof I have signed my name to this specification in the presence of two subscribing witnesses.

ROBERT W. THOMSON.

Witnesses:
   G. W. GREGORY,
   E. J. BENNETT.